United States Patent
Lin et al.

(10) Patent No.: US 7,195,322 B2
(45) Date of Patent: Mar. 27, 2007

(54) VIBRATION-PROOF WHEELS FOR WHEELED LUGGAGE

(75) Inventors: Jer Hong Lin, Taipei (TW); Boon Hwa Lau, Taipei (TW)

(73) Assignee: Chaw Khong Technology Co., Ltd., Wu Ku Hsiang (TW)

( * ) Notice: Subject to any disclaimer, the term of this patent is extended or adjusted under 35 U.S.C. 154(b) by 56 days.

(21) Appl. No.: 10/910,300

(22) Filed: Aug. 4, 2004

(65) Prior Publication Data

US 2005/0077778 A1    Apr. 14, 2005

(30) Foreign Application Priority Data

Aug. 4, 2003 (CN) .............................. 03 2 06849

(51) Int. Cl.
*A45C 5/14* (2006.01)
(52) U.S. Cl. .............................. 301/111.05; 301/5.304; 190/18 A
(58) Field of Classification Search ............ 301/5.304, 301/111.05, 111.07, 119, 125; 190/18 A; 16/44; 280/47.26
See application file for complete search history.

(56) References Cited

U.S. PATENT DOCUMENTS 2,738,542 A * 3/1956 Clark, Jr. ....................... 16/44
3,349,425 A * 10/1967 Reabelos ....................... 16/44
5,355,550 A * 10/1994 Yang .............................. 16/44
5,873,145 A * 2/1999 Chou ............................. 16/46
6,193,324 B1* 2/2001 Chang .................. 301/111.05
6,382,736 B1* 5/2002 Chang .................. 301/111.05
6,758,534 B2* 7/2004 Lampugnani .......... 301/111.05
6,769,701 B1* 8/2004 Clausen ....................... 280/37

* cited by examiner

*Primary Examiner*—Russell D. Stormer

(57) ABSTRACT

A luggage wheel assembly comprises an L-shaped bezel including a hollow lower portion of arcuate section, and a well defined by the lower portion for receiving a wheel; and a shock absorber extended from the wheel into the lower portion. Lower, oblique first slot and upper, oblique second slot are provided on either side of an inner wall of the lower portion respectively. A wheel mount comprises a lower hole at either side, an upper hole at either side, an axle inserted through the first slot and the lower hole at one side, a hub of the wheel, and the lower hole and the first slot at the other side, two pins inserted through the upper holes and the second slots, and two C-shaped clips put on projected shanks of the pins on the second slots for fastening. The invention can eliminate wobbles occurred when towing on uneven surfaces.

2 Claims, 5 Drawing Sheets

VIBRATION-PROOF WHEELS FOR WHEELED LUGGAGE

BACKGROUND OF THE INVENTION

1. Field of the Invention

The present invention relates to wheel assembly and more particularly to wheel assemblies with shock absorbing means adapted for use on luggage such that wobbles experienced by well known wheeled luggage while towing on uneven surfaces can be substantially eliminated.

2. Description of Related Art

Wheels play an important role in carrying luggage. Thus, malfunctioned wheel assemblies mean the luggage is of no use. Further, loud sound produced by wheels while towing luggage is not acceptable. Furthermore, wheels tend to shimmy and wobble when exposed to uneven surfaces. This can bring a degree of discomfort to the user. Moreover, abnormal vibration can wear out axles in a short period of time of use, resulting in a shortening of life. Hence, a need for improvement exists.

SUMMARY OF THE INVENTION

It is an object of the present invention to provide vibration-proof wheel assemblies with shock absorbing means adapted for use on luggage such that wobbles experienced by well known wheeled luggage while towing on uneven surfaces can be substantially eliminated.

It is another object of the present invention to provide a vibration-proof wheel assembly for wheeled luggage having spring-loaded shock absorbing means provided between the wheel and the luggage frame, thereby producing minimum sound while towing on uneven surfaces and reducing the wearing on the axle to a minimum.

To achieve the above and other objects, the present invention provides a wheel assembly for supporting an article of luggage, comprising a wheel; a substantially L-shaped bezel integrally formed with the luggage frame and including an upper portion, a hollow lower portion of arcuate section, and a well defined by the lower portion; and spring means extended from the wheel into the lower portion for absorbing the forces of shocks and jarring generated while towing the luggage.

In one aspect of the present invention, the spring means comprises a cylindrical receptacle projected obliquely from an inner wall of the lower portion toward inside, a wheel mount formed over the wheel, a post projected obliquely from the wheel mount and aligned with the receptacle, and a spring disposed in the receptacle and put on the post for anchoring.

In another aspect of the present invention, there are further provided a lower, oblique, elongated first slot provided on either side of the inner wall of the lower portion, and an upper, oblique, elongated second slot provided on either side of the inner wall of the lower portion.

In a further aspect of the present invention, the wheel mount is concave and comprises a lower hole provided at either side, an upper hole provided at either side, an axle inserted through the first slot and the lower hole at one side, a hub of the wheel, and the lower hole and the first slot at the other side, two pins inserted through the upper holes and the second slots, and two C-shaped clips put on projected shanks of the pins on the second slots for fastening.

The above and other objects, features and advantages of the present invention will become apparent from the following detailed description taken with the accompanying drawings.

DETAILED DESCRIPTION OF THE PREFERRED EMBODIMENTS

Figure 1:
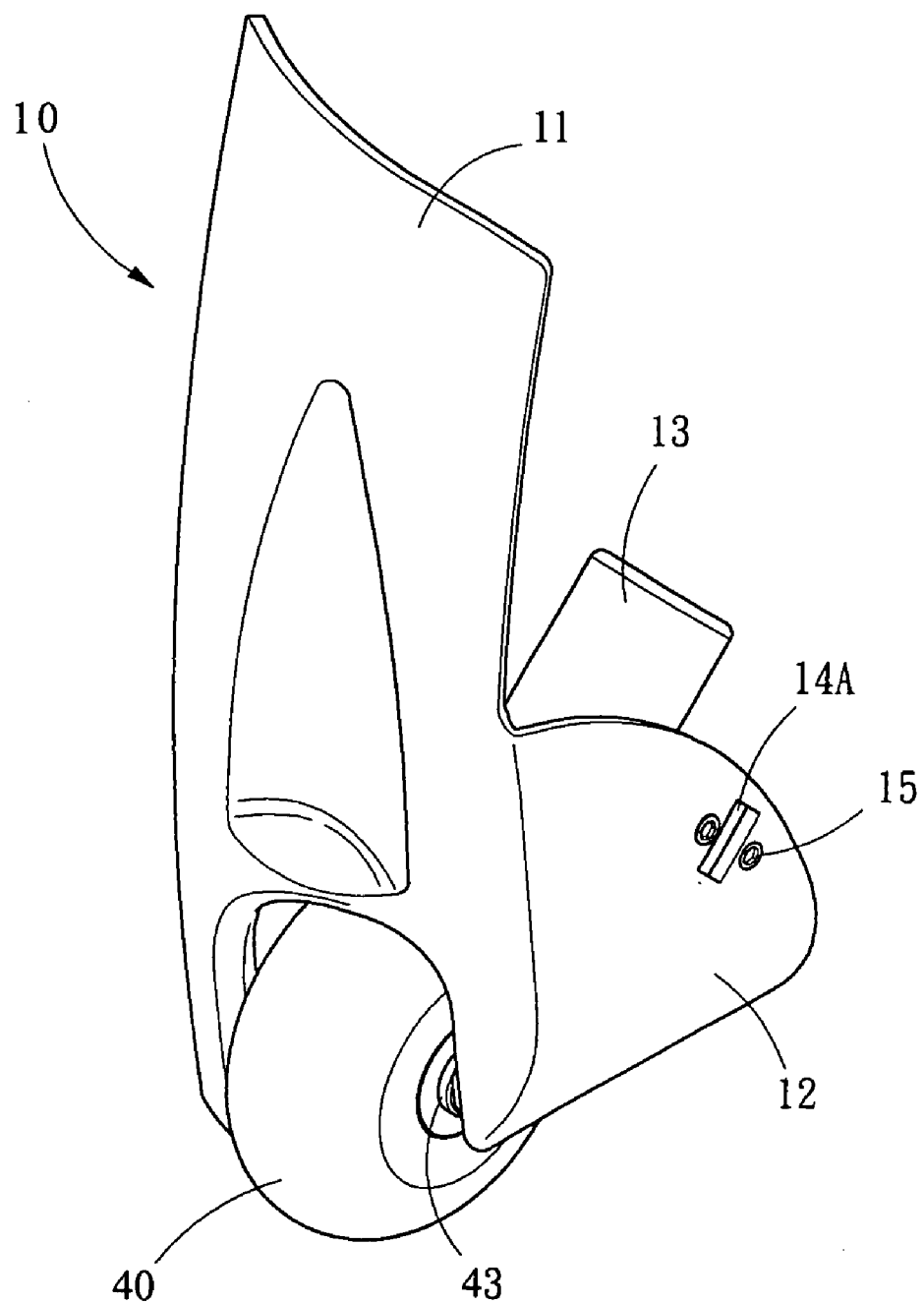
FIG. 1 is a front, perspective view of a preferred embodiment of wheel assembly according to the invention mounted in a luggage corner.

Referring to FIGS. 1 to 5, there is shown a vibration-proof wheel assembly mounted in a bottom corner of luggage in accordance with a preferred embodiment of the invention. The embodiment comprises a bezel 10, a spring 20, a wheel mount 30, and a wheel 40. Each component will be described in detailed below.

The bezel 10 is integrally formed with the luggage frame and comprises an upper portion 11, an integral, hollow lower portion 12 of arcuate section, a well 120 defined by the lower portion 12, a cylindrical, transparent receptacle 13 projected obliquely from an inner wall of the lower portion 12 toward inside, a lower, oblique, elongated first slot 16 provided on the inner wall at either side of the lower portion 12, and an upper, oblique, elongated second slot 17 provided on the inner wall at either side of the lower portion 12, the second slot 17 being aligned with the first slot 16.

The wheel 40 comprises a tire 41 and two bearings 43 having a transverse hole mounted in a hub 42. The concave wheel mount 30 comprises an arcuate fender 31, a post 32 projected obliquely from an outer surface of the fender 31 and aligned with the receptacle 13 such that the spring 20 disposed in the receptacle 13 is adapted to put on the post 32 for anchoring, a lower hole 36 at either side, an upper hole 33 at either side, an axle 37 inserted through the first slot 16 and the lower hole 36 at one side, the bearings 43, and the lower hole 36 and the first slot 16 at the other side until its head 371 is stopped by the mouth of the first slot 16 at one side such that a rivet 373 is able to insert into a threaded hole 372 at an open end of the axle 37 for completing the mounting of the wheel 40, and two pins 34 inserted through the upper holes 33 and the second slots 17 to be fastened by mounting two C-shaped clips 35 on the projected shanks of the pins 34 on the second slots 17.

Figure 3:
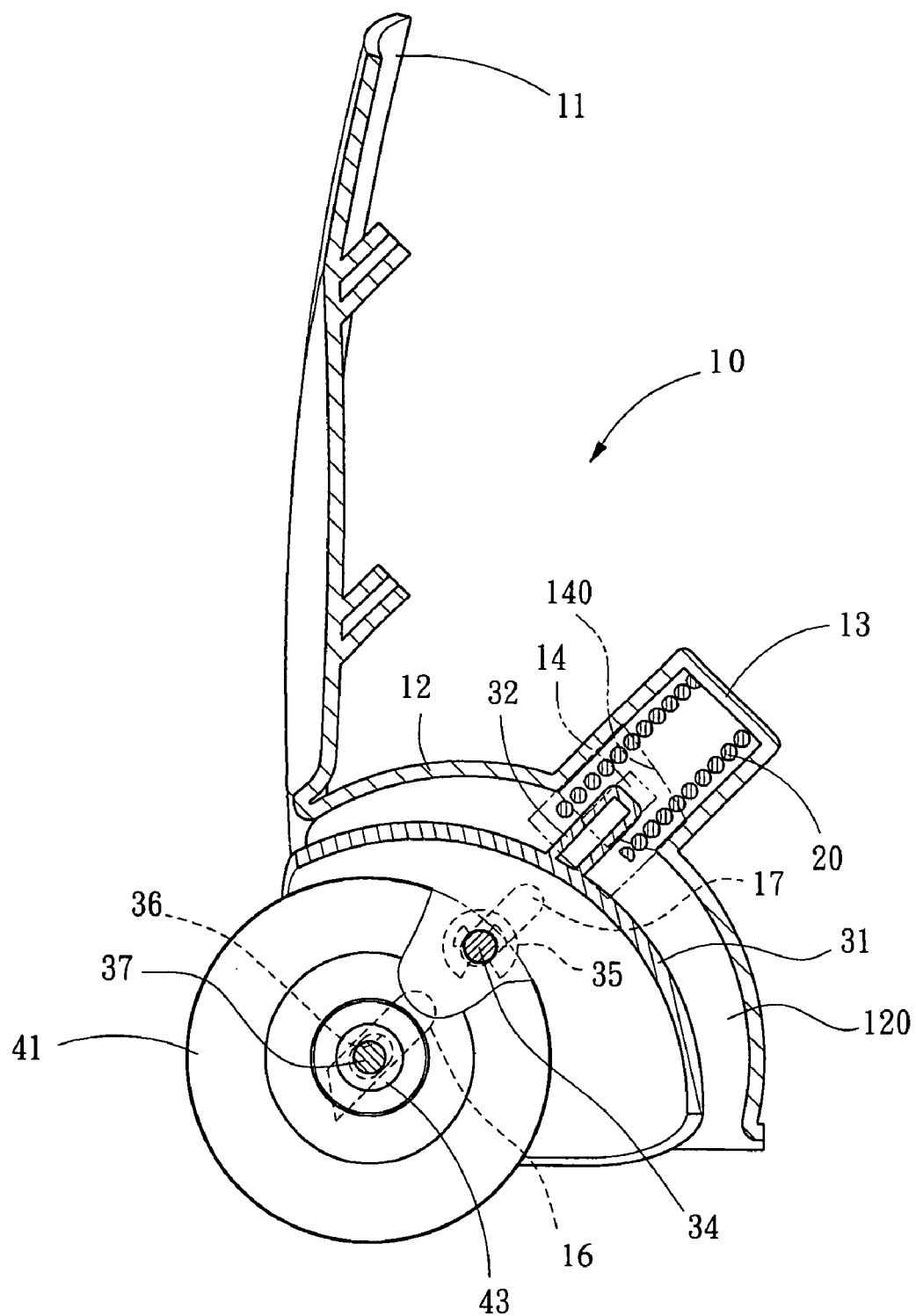
FIGS. 3 and 4 are sectional views of the wheel assembly showing different configurations when luggage is in upright and towing positions respectively.
Figure 4:
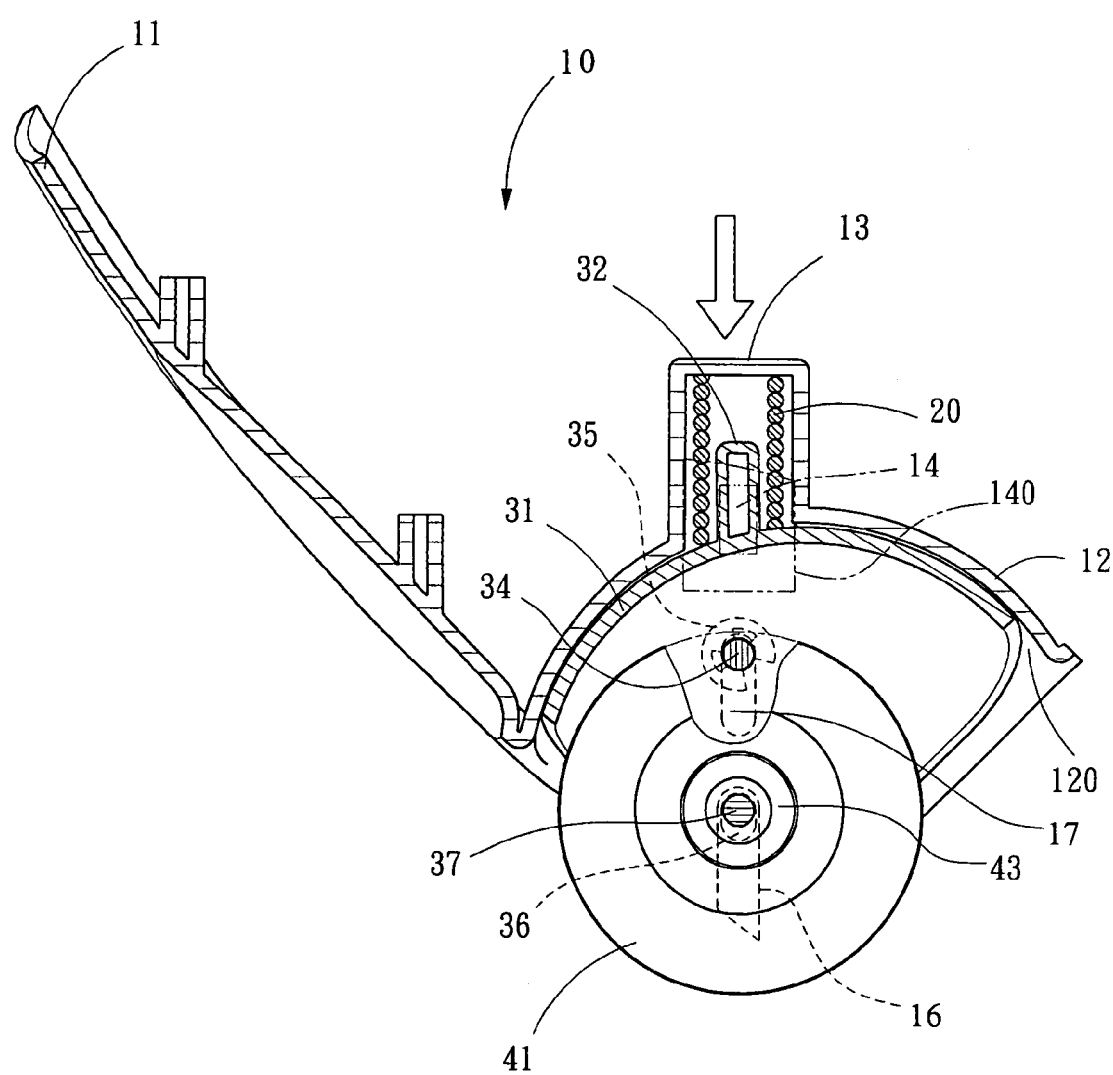

An operation of the wheel assembly with shock absorbing capability will be described in detailed below. As shown in FIG. 3, either end of the axle 37 is about in a center of the oblique first slot 16, either pin 34 is in a lowest end of the oblique second slot 17, the spring 20 is expanded, and a gap is formed between the fender 31 and the lower portion 12 of the bezel 10 when luggage is in an upright position. To the contrary, either end of the axle 37 is in a highest end of the upright first slot 16, either pin 34 is in a highest end of the upright second slot 17, the spring 20 is compressed, and there is almost no gap between the fender 31 and the lower portion 12 of the bezel 10 when luggage is towing (see FIG. 4). That is, the axle 37 is constrained by the first slot 16 and is adapted to move in a distance defined by the length of the first slot 16 in response to the spring compression, the pin 34 is constrained by the second slot 17 and is adapted to move in a distance defined by the length of the second slot 17 in response to the spring compression, and thus the wheel mount 30 is adapted to suspend under the bezel 10 due to the provision of the spring mechanism. In the configuration shown in FIG. 4, luggage weight borne upon the wheel mount 30 and the wheel 40 is substantially totally absorbed by the compressed spring 20. This is particularly beneficial since wobbles experienced by well known wheeled luggage while towing on uneven surfaces is substantially eliminated. Also, a minimum sound is produced. Further, the wearing on the axle 37 is reduced to a minimum.

Figure 2:
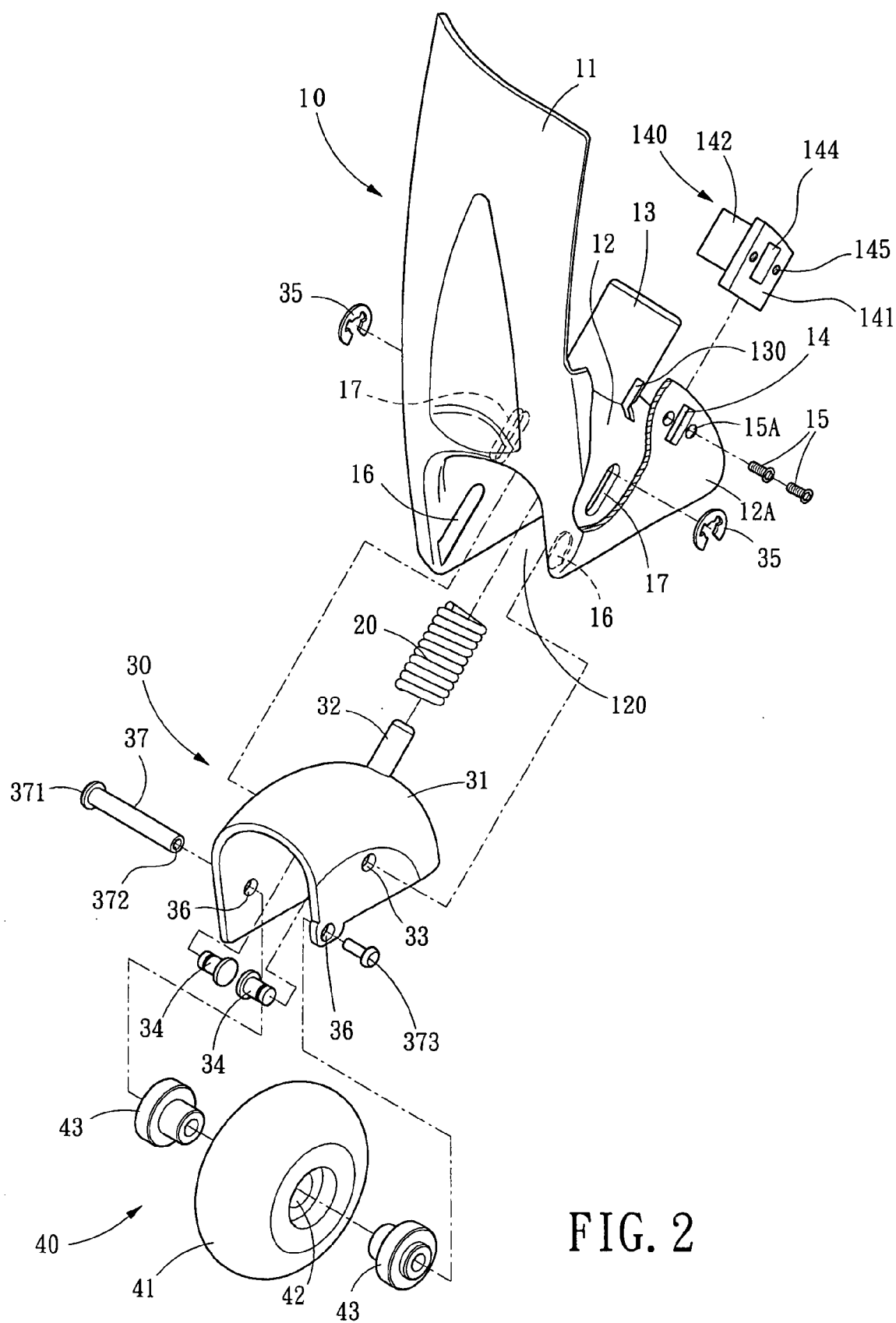
FIG. 2 is an exploded view of the wheel and a portion of the luggage frame shown in FIG. 1.
Figure 5:
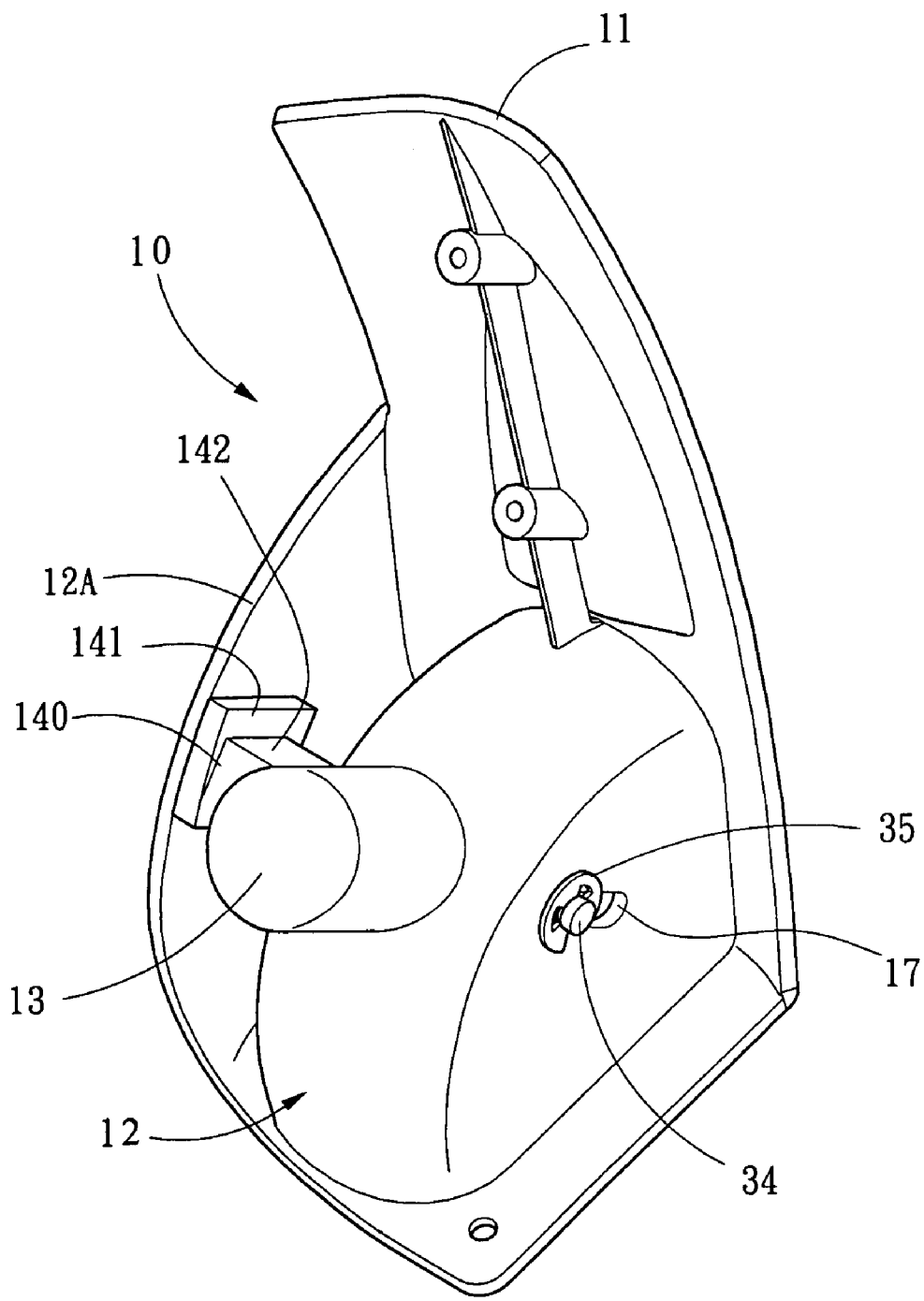
FIG. 5 is a rear, perspective view of the wheel assembly.

Referring to FIGS. 1, 2 and 5, a window 14 is provided on an outer surface 12A of the lower portion 12 of the bezel 10 so that a user may view the compression and expansion of the spring 20. A transparent block 140 comprises two threaded holes 145 on an outer panel 141 so that two screws 15 can be driven through two holes 15A on the outer surface 12A into the holes 145 for fastening the block 140 on the outer surface 12A. An inner end of the transparent block 140 is secured by a member 130 on an outer surface of the receptacle 13. In this position, the window 14 is aligned with a channel 144 of a hollow member 142 such that the above viewing purpose can be achieved.

While the invention herein disclosed has been described by means of specific embodiments, numerous modifications and variations could be made thereto by those skilled in the art without departing from the scope and spirit of the invention set forth in the claims.

What is claimed is:

1. A wheel assembly for supporting an article of luggage, comprising:
   a wheel;
   a substantially L-shaped bezel including an upper portion, a hollow lower portion of arcuate section, and a well defined by the lower portion; and
   spring means extended from the wheel into the lower portion for absorbing the forces of shocks and jarring generated while towing the luggage wherein the wheel assembly further comprises a lower, oblique, elongated first slot provided on either side of the inner wall of the lower portion, and an upper, oblique, elongated second slot provided on either side of the inner wall of the lower portion.

2. The wheel assembly of claim 1, wherein the wheel mount is concave and comprises a lower hole provided at either side, an upper hole provided at either side, an axle inserted through the first slot and the lower hole at one side, a hub of the wheel, and the lower hole and the first slot at the other side, two pins inserted through the upper holes and the second slots, and two C-shaped clips put on projected shanks of the pins on the second slots for fastening.

* * * * *